F. C. BITZENBURGER.
TIRE GUARD.
APPLICATION FILED JUNE 7, 1917.
1,257,305.
Patented Feb. 26, 1918.
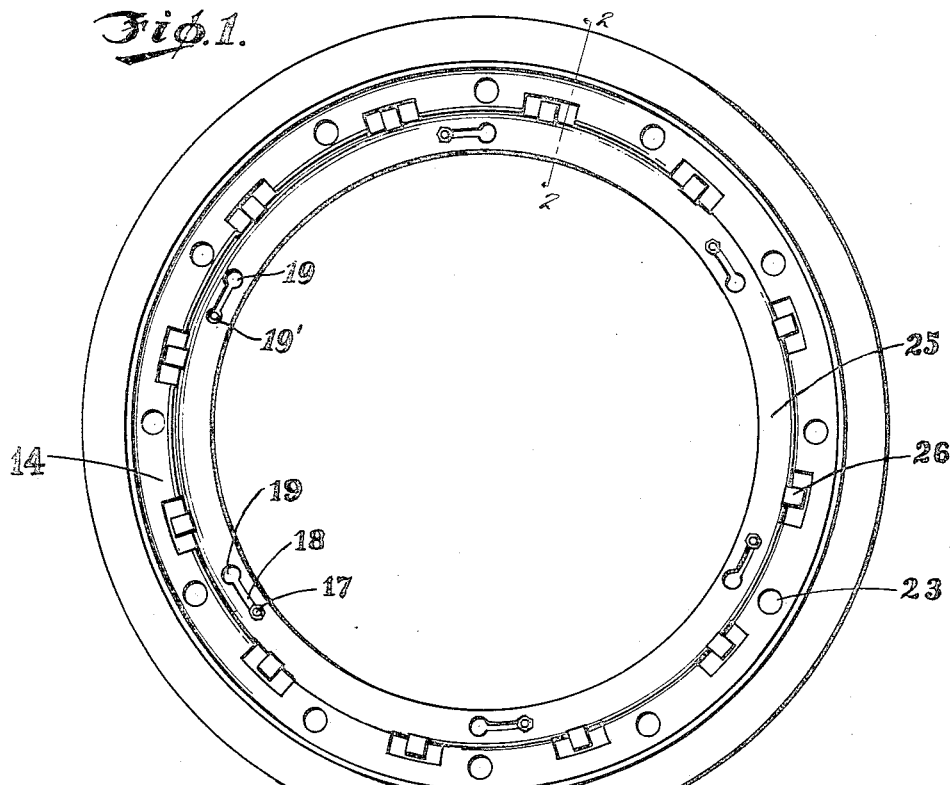
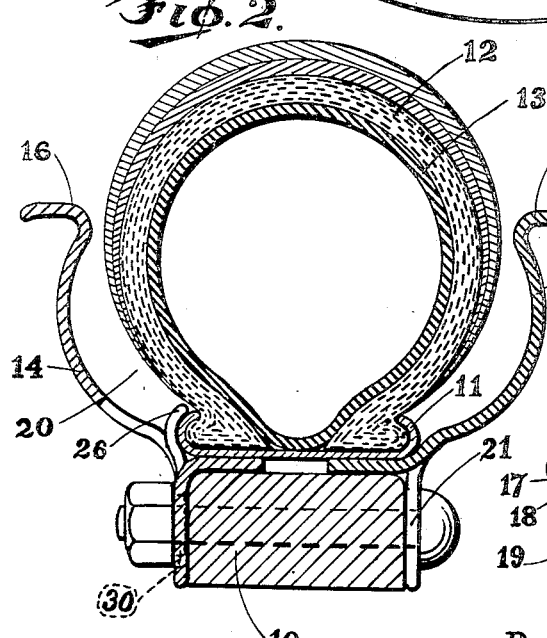
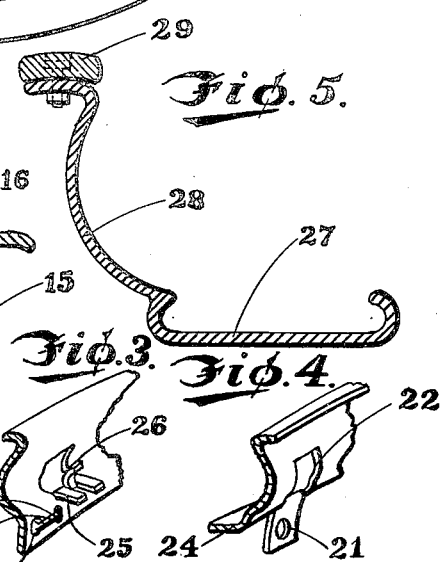
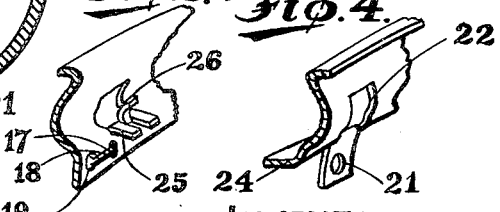
INVENTOR.
FRANK C. BITZENBURGER.
By Hazard & Miller
Attorneys.

UNITED STATES PATENT OFFICE.

FRANK C. BITZENBURGER, OF LOS ANGELES, CALIFORNIA.

TIRE-GUARD.

1,257,305.

Specification of Letters Patent.

Patented Feb. 26, 1918.

Application filed June 7, 1917. Serial No. 173,424.

*To all whom it may concern:*

Be it known that I, FRANK C. BITZENBURGER, a citizen of the United States, residing at Los Angeles, in the county of Los Angeles and State of California, have invented new and useful Improvements in Tire-Guards, of which the following is a specification.

This invention relates to pneumatic tires and particularly pertains to guards therefor.

When a pneumatic tire is punctured, or for other reasons becomes blown out, it often happens that the driver of the vehicle is not equipped with repair supplies and the car must necessarily be driven to a place of repair upon the deflated casing. The weight of the vehicle will damage the casing and it will be cut and stone bruised. It is the principal object of this invention to provide a protective guard which partially surrounds the casing of the pneumatic tire and carries the weight of the vehicle when the tire is deflated without material damage to the tire.

Another object of this invention is to provide a tire guard formed of few parts and which may be easily mounted in position around the felly of motor vehicle wheels.

Another object of this invention is to provide a tire guard which may be equipped with tread portions adapted to act as auxiliary treads when the tire is deflated.

It is a further object of this invention to provide a device of the above character which may be inexpensively manufactured and applied for use, and which will not produce an unsightly appearance upon the wheel.

Other objects will appear hereinafter.

The invention is illustrated, by way of example, in the accompanying drawings in which:

Figure 1 is a view in side elevation illustrating the outer face of a vehicle wheel fitted with a pneumatic tire and the guard with which the present invention is concerned.

Fig. 2 is a sectional view, as seen on the line 2—2 of Fig. 1, and particularly illustrates the sectional formation of the tire guards and their application to the wheel felly.

Fig. 3 is a fragmentary view in perspective illustrating a section of the outer guard plate.

Fig. 4 is a fragmentary view in perspective illustrating a section of the inner guard plate.

Fig. 5 is a view in transverse section illustrating a modified form of the invention which combines the guard plate with the clencher tire rim and also utilizes an auxiliary tread which is mounted upon the circumferential edge of the plate.

Referring more particularly to the drawings, 10 indicates a wheel felly upon which is mounted, in any suitable manner, a clencher tire rim 11. This rim is adapted to detachably engage the clencher beads formed upon a pneumatic tire casing 12 within which a tire tube 13 is inclosed. It will be understood that the felly, clencher rim, and tire are of standard construction and that the present invention is concerned with a guard for the tire.

The tire guard comprises an annular outer guard plate 14 and an annular inner guard plate 15. The terms "outer" and "inner" are used to designate the relation of the guard plates to the body of the vehicle. The outer guard plate is formed with a continuous out turned flange 16 which is integral with the side plate 14. This plate extends inwardly along the outer side of the tire casing, and is engaged at intervals by locking bolts 17 which extend transversely through the wheel felly. The openings through which the bolts pass are shaped with open ended slots 18, having one end enlarged to form a circular opening 19 through which the nut or head of the bolt may be passed, thus providing a quick detachable fastener. The body of the plate 14 bulges out entirely around the wheel to form part of a tire pocket 20. The remainder of this pocket is formed by the inner guard plate 15 which bulges out from the side of the tire and which is secured to the felly by the bolts 17. Downwardly extending tangs 21 are formed to receive these bolts, as particularly illustrated in Fig. 4. These tangs are struck from the side of the plate 15 and thus form ventilating openings 22. Other ventilating openings are provided by perforating the guard plates, as indicated by the numeral 23.

In order that the guard plates may be held in rigid relation to the clencher rim 11, an annular flange 24 extends outwardly and between the clencher rim and the felly from the guard plate 15. The outer guard plate 14 is formed with a series of inturned tangs 25 which project between the felly and the clencher rim and also have outturned portions 26 which pass upwardly and bear against the edge of the rim, thus holding all of the members in rigid relation thereto.

In order that the outer guard plate 14 will not become accidentally detached, the slots 18 are formed with enlarged end openings 19' at the opposite ends from the clearance openings 19. The openings 19 are adapted to receive a cylindrical shoulder 30 formed on the inner face of the bolt nuts, thus after the nuts have passed through the openings and have been slipped along the slots, the bolts may be tightened and the shoulders 30 caused to be seated within the openings 19'. In this manner the guard rim 14 is held against movement and is positively locked.

In the modified form of the invention a clencher rim 27 is formed integral with an outer side plate 28, the inner side of the tire being protected by the guard plate 15, as previously described. The outturned circumferential flanges of the inner plate 15 and the outer plate 28 are provided with a rubber facing 29 which forms an auxiliary traction tread for the wheel.

In operation, the guard plates 14 and 15 are positioned at the opposite sides of the wheel felly and the tire, as particularly shown in Fig. 2 of the drawings. The tire may then be inflated, as desired. When the tire is punctured it will, of course, become deflated and the casing will be depressed and caused to occupy the pocket 20 formed by the plates 14 and 15. This will permit the weight of the vehicle to be carried upon the circumferential flanges 16 of the two plates and will protect the tire against wear, as well as the detrimental effects produced by the crushing of the casing. When the tread portions 29 are used, the wheels will travel more satisfactorily and with less danger of slippage.

It will thus be seen that the tire guard here disclosed is simple in its construction, may be easily mounted in position, and will effectively produce the results, as described.

While I have shown the preferred construction of my tire guard as now known to me, it will be understood that various changes in the combination, construction and arrangement of parts may be made by those skilled in the art without departing from the spirit of my invention.

I claim:

1. In a tire guard, the combination with a pneumatic tire casing mounted upon a demountable rim and disposed around the felly of a vehicle wheel, of a guard plate positioned at one side of the pneumatic tire and having a flange resting against the side of the felly and tangs resting between the felly and rim, a second guard plate positioned at the opposite side of the pneumatic tire and having tangs resting against the side of the felly and a flange resting between the felly and rim, and bolts inserted through the flange at one side of the felly, through the felly, and through the tangs at the other side of the felly.

2. In a tire guard, the combination with a pneumatic tire casing positioned upon a demountable rim and disposed around the felly of a vehicle wheel, of a guard plate positioned at one side of said tire and spaced a distance therefrom; said plate terminating substantially along the side of the tire; a continuous inturned flange formed as a part of said plate and extending between the felly and the tire rim, tangs extending from the plate and alongside the wheel felly and provided with bolt holes, bolts extending through said holes and the felly, a second guard plate disposed along the opposite side of the tire, inturned tangs formed as a part of said second plate and extending between the tire rim and wheel felly, a continuous flange extending from the plate and alongside the adjacent face of the wheel felly, and lock slots formed through said flange at intervals and having large open ends to receive the nuts of the bolts which extend through the tangs of the opposite plate and the felly, and said slots having narrow portions over which the nuts may be slipped and along which the bolts may be moved.

3. In a tire guard, the combination with a pneumatic tire casing positioned upon a demountable rim and disposed around the felly of a vehicle wheel, of a pair of annular oppositely disposed guard plates detachably secured to the felly of the wheel; said plates having body portions of arcuate section which are spaced a distance from the sides of the tire and are designed to partially inclose the tire body, and annular flanges formed around the marginal edges of said body portions and extending outwardly from the tire to provide a tread for the wheel when the tire is deflated and has been compressed into the space between the guard plates.

In testimony whereof I have signed my name to this specification.

F. C. BITZENBURGER.